July 14, 1942. B. C. BECKER Re. 22,132
SUCTION CLEANER
Original Filed Dec. 5, 1938 2 Sheets-Sheet 1
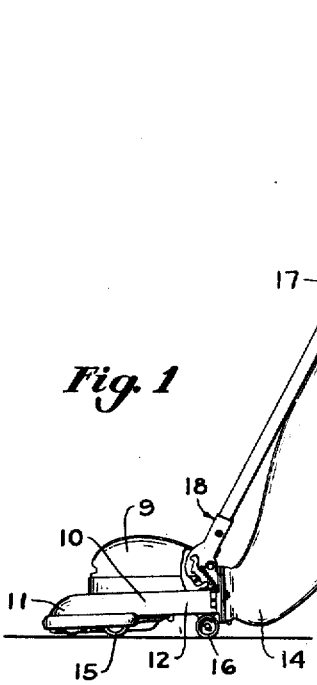
Fig. 1
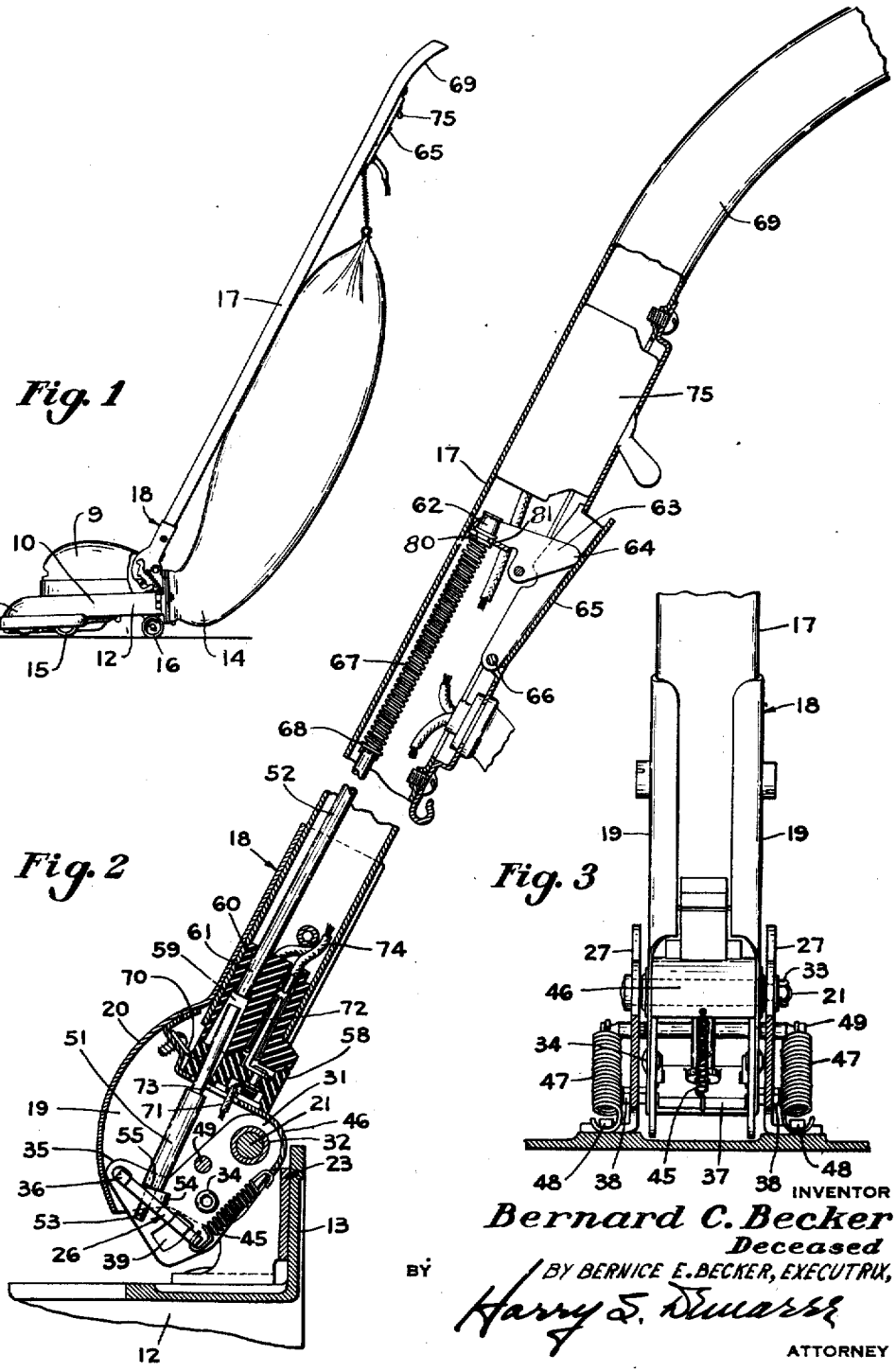
Fig. 2
Fig. 3
INVENTOR
Bernard C. Becker
Deceased
BY BERNICE E. BECKER, EXECUTRIX,
BY Harry S. Dwarsh
ATTORNEY July 14, 1942. B. C. BECKER Re. 22,132

SUCTION CLEANER

Original Filed Dec. 5, 1938 2 Sheets-Sheet 2

INVENTOR

Bernard C. Becker

Deceased

BY BERNICE E. BECKER, EXECUTRIX

BY Harry S. Dwiggins

ATTORNEY

Reissued July 14, 1942 Re. 22,132

UNITED STATES PATENT OFFICE 22,132

SUCTION CLEANER

Bernard C. Becker, deceased, late of Canton, Ohio, by The Hoover Company, assignee, North Canton, Ohio, a corporation of Ohio Original No. 2,218,160, dated October 15, 1940, Serial No. 243,954, December 5, 1938. Application for reissue November 13, 1940, Serial No. 365,555

9 Claims. (Cl. 306—13)

The present invention relates to suction cleaners and particularly to a new and improved handle control mechanism in a suction cleaner. More specifically the invention comprises an improved handle position control in a suction cleaner which is characterized in that a hand-operated mechanism controls the positions and ranges of movement of the pivoted cleaner handle.

It is an object of the present invention to provide a new and improved suction cleaner. It is another object to provide new and improved handle controlling means in a suction cleaner. It is another object to provide a handle control which is hand-operated to control the movement of the handle to different operating positions. A further object is to provide a novel electrical connector to accommodate part of the handle control mechanism. Further objects and advantages of the invention will be apparent upon referring to the following specification and claims and the attached drawings, wherein:

Figure 1 is a side elevation of a suction cleaner embodying the present invention with certain parts broken away;

Figure 2 is an enlarged longitudinal sectional view showing one embodiment of the invention;

Figure 3 is a rear elevation of part of the construction shown in Figure 2;

Figures 4, 5:
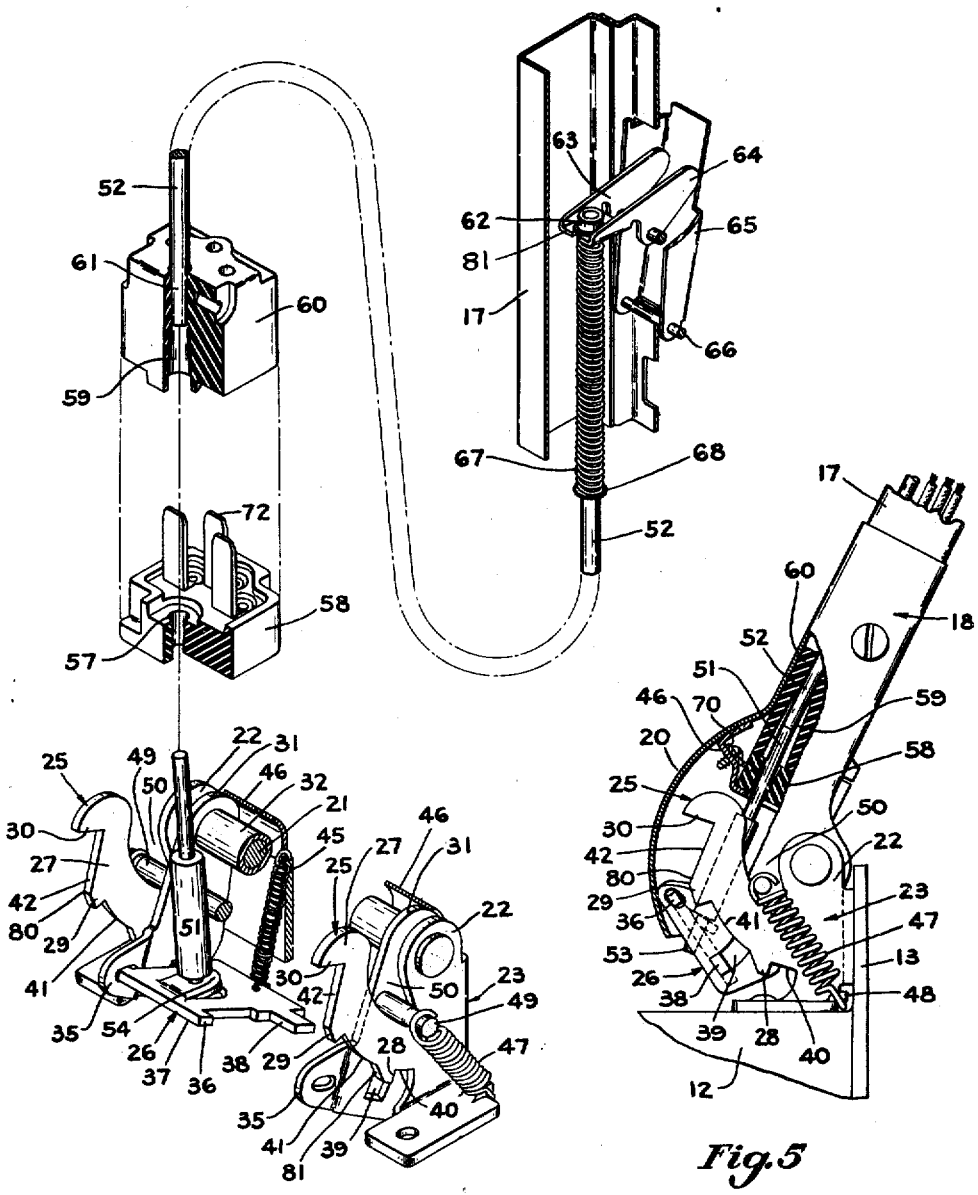
Figure 4 is an exploded view showing the relation of the parts constituting the handle control mechanism.
Figure 5 is a side elevation with the handle broken away to show the control mechanism in handle release position.

An embodiment of the invention is disclosed in a suction cleaner comprising a main casing 10 having a nozzle 11 and an unshown fan chamber communicating with an exhaust passageway 12. The rear of the exhaust passageway is provided with a vertical flange 13 to which is removably secured a dust bag 14. The casing 10 supports an unshown motor enclosed in a motor housing 9, and the motor operates an unshown fan to create suction and draw dirt laden air from the surface being cleaned through the nozzle 11, the unshown fan chamber, and exhausts it through the exhaust passageway 12 into the dirt-filtering bag 14. The cleaner is supported on front and rear wheels 15 and 16, respectively.

The cleaner is propelled over the surface covering by means of a handle 17 pivotally mounted to the body of the cleaner through being removably clamped in a split socket 18 which is formed with integral flat side faces 19, 19 spaced apart by substantially the diameter of the handle and joined by a circular top wall 20 substantially concentric with the pivotal axis of the handle and socket. The pivotal axis is formed by a headed pin 21 which extends through the faces 19, 19 of the handle socket and is carried by the side walls 22, 22 of a bracket 23 being secured by a nut 33 secured on the threaded end thereof. The bracket 23 is rigidly mounted upon the top surface of the exhaust outlet 12, its side walls 22, 22 being arranged exteriorly of the side faces 19, 19 of the handle socket 18.

The handle-position-controlling mechanism comprises segment means 25 and cooperating locking detent means 26. The segment means include a pair of sectors or segments 27, 27 formed integral with the side walls 22, 22 of the bracket 23 and are provided along their outer and lower edges with three distinct ranges 40, 41 and 42 of detent positions by stops 28, 29 and 30. The detent ranges correspond, as will become apparent hereinafter, with certain handle positions and ranges of movement.

Cooperating with the sectors 27, 27 is the locking detent means 26 comprising the latch plate 37 which is pivotally mounted upon a pair of spaced arms 31, 31 which extend adjacent the socket side faces 19, 19, one arm being rigidly secured to the inner side of each face by a rivet 34. The sleeve 32 rotatably seats upon the pivot pin 21 and extends through the arms 31, 31 and faces 31, 31 to provide a bearing surface for the handle socket upon the pin 19. Each of the arms 31 is formed with a forward portion 35 which extends outwardly and beyond the sectors 25 from the pivotal axis as determined by the pin 21. Suitable openings are provided in the forward ends 35, 35 of the spaced arms 31, 31 to loosely pivotally receive the projecting lugs 36, 36 of the locking or latch plate 37 from which extend locking detents or latch pins 38, 38 loosely disposed in elongated arcuate slots 39, 39 in the arms 31, 31. The detents 38, 38 extend transversely of the lower end of the handle socket 18 and are adapted to register in the recesses 40 defined by the stops 28 in the segments to hold the handle in storage position, and are engageable with the recessed surfaces 41 between the stops 28 and 29 to permit movement of the handle through an intermediate operating range, and along the surfaces 42 between the stops 29 and 30 to permit movement of the handle through a low operating range. It is to be noted that the surface 41 inclines gradually to the top of the stop 28 defining the surface 40, and that the surface 42 inclines gradually to the top of the stop 29 defining the adjacent extremity of the surface 41, whereby each detent 38 may move without interference from surface 42, to 41 to 40 but cannot move, without being lifted above the stops 28 and 29, when traveling in the opposite direction. Attention is also directed to the fact that the surface 40 is of a length substantially equal to the size of the detent 38 so that when positioned thereon the detent is substantially fixed in position whereas the surfaces 41 and 42 are much greater in length so that the detent has a range of movement or positions thereon.

A spring 45 is secured to the movable detent-carrying end of the latch plate 37 and to a handle socket bottom cover plate 46 to urge at all times the locking detents 38, 38 into engagement with the sectors 27, 27. As certain surfaces of the sectors or segments 25, 25 face outwardly and downwardly a positive spring force is necessary to hold the detents 38, 38 in seating position thereagainst for under the influence of gravity plate 37 would pivot therefrom or at the most would make very light contact therewith. Relatively strong springs 47, 47 are arranged one upon each side of the bracket 23 adjacent the side walls 22, 22 with one end of each spring attached to a lug 48 formed integrally with the bracket 23 and their outer ends secured to the opposite ends of a pin 49 which extends through the handle socket 18 and the arms 31, 31 and moves in slots 50 formed in the bracket 23 when the handle is moved to different operative positions. The springs 47, 47 are arranged below the pivot pin 21 and at all times exert a force to move the handle upwardly to counterbalance the handle weight.

A hand operated mechanism is provided to operate the detent plate 37 and comprises two rods 51 and 52, the lower rod 51 having its extreme end 53 reduced and disposed in an opening in a tab 54 of the detent plate 37, the shoulder 55 formed by the reduction in the diameter of the rod 51 resting on the tab 54. The tab 54 is disposed at an angle with the latch member 37 to provide a substantial surface contact with the shoulder 55. The upper end of the lower rod 51 is reduced in diameter and extends slidably through an opening 57 in the insulation of an electric plug 58 and into an enlarged recess 59 in the insulation of an electrical receptacle 60. Extending longitudinally through the handle 17 is the upper rod 52 having its lower end 61 extending through the insulation of the electrical receptacle 60 into the enlarged recess 59 therein. The upper end 62 of the rod 52 extends through the forked end 81 of the lever 63 which is pivotally mounted in the handle and has a portion 64 upon the opposite side of the pivot in sliding engagement with hand actuated lever 65. Hand actuated lever 65 is pivoted at 66 to the handle and is movable inwardly and outwardly relatively to the handle within a definite angular range determined by integral stops at its upper end and in a manner clearly suggested in Figures 2 and 4. A spring 67 is arranged about the rod 52 and between a lower rigid stop 68 on the latter and a collar 80 carried by the forked end 81 of lever 63 which is slidably mounted on the rod 52 and limited as to movement in an upward direction by the upper end 62 of the rod. The hand operated lever 65 is normally urged to the handle locking position shown in Figure 2 to provide a dead man handle control, due to the force exerted by the spring 67, the latter also urging the rod downwardly in the handle toward the lower rod 51. The spring 67 is seen to perform a plurality of functions, one that of urging the lever 63 upwardly at its point of contact therewith and through it the manually operable lever 65 to its outer position; additionally that of urging the rod 52 downwardly using the lever 63 as its upper support which is in fact a rigid one with the lever 65 in its outer position; further a force to move the rod 52 downwardly by inward movement of the lever 65 must be transmitted through spring 67. Attention is directed to the fact that the lever 65 is arranged adjacent the hand grip 69 at the top of the handle, whereby the operator can conveniently operate the hand lever 65.

The electric plug 58 is removably attached in the handle socket 18 by a clamp 70 secured to the socket bottom plate 46 which is welded to the handle socket 18 and forms a bottom wall of the socket, and to which one end of the latch spring 45 is attached. Suitable electrical conductors 71 extend from the contacts 72 in the plug receptacle through an elongated opening 73 in the bottom plate 46 to the unshown motor. The electrical receptacle 60 not only includes means defining an enlarged chamber 59 for effecting operative engagement of the two rods 51 and 52 but also is provided with contacts for connection to electrical conductors 74 which extend upwardly in the handle to a switch 75.

In operation, assume the handle 17 to be in storage or vertical position, the locking detents 38, 38 being held in the recesses 40, 40 by the spring 45. In order to lower the handle to a convenient operating angle the operator places his hand about the handle 17 and presses the hand lever 65 inwardly which pivots the lever 63 in a counterclockwise direction, as viewed in Figure 2, and causes the rod 52 to move downwardly in the handle, through the action of the spring 67. The lower end of rod 52 engages the upper end of the lower rod 51 causing the latter to move the latch plate 37 about its pivot pins 36, 36. The latch plate 37 moves against the force of the spring 45 and causes the detents 38, 38 to move out of the recesses 40, 40 to clear the stops 28, 28. The handle 17 can then pivot downwardly into the operating range with the detents 38, 38 positioned adjacent the surfaces 41, 41 between the stops 28 and 29. The operator releases the hand lever 65 and the latch spring 45 pivots the latch plate 37 into contact with the sectors 27, 27 whereupon the locking detents 38, 38 ride on the surfaces 41, 41. The movement of the plate 37 under the actuation of the spring 45 also results in the upward movements of the rods 51 and 52, the latter being forced upwardly by the former. This movement stops upon the detents 38, 38 abutting the sectors 27, 27. The spring 67 returns the levers 63 and 65 to their original position in readiness for a later releasing operation. If the operator desires to use the handle in lowered position the hand lever 65 is operated to pivot the latch plate 37 which moves the locking detents 38, 38 whereby the handle can be pivoted downwardly until the detents pass the stops 29, 29 and enter the working range between the stops 29 and 30 at which time the operator releases the hand lever 65 and the detents 38, 38 will ride upon the surfaces 42, 42. Should the operator desire to return the handle to the higher operating range or storage position he merely pivots the handle upwardly and the detents 38, 38 will ride over the stops 29 and 28, the surfaces 42 and 41 being inclined to permit this result, as above described, and functioning to force the latch plate 37 to move against the force of the spring 45, without the necessity of manipulating the hand lever 65.

From the foregoing it will be perceived that the motor housing 9 extends rearwardly to enclose the handle pivot 21, that the locking detent means are disposed within the confines of the handle socket and are carried by and pivoted to the latter below the pivotal axis of the handle in certain handle positions, that the segment means are rigidly mounted upon the top surface of the cleaner exhaust, and that the insulation of the electrical connector is provided with means to accommodate the two rods 51 and 52 forming part of the hand operated handle control mechanism.

It is to be understood that the protection herein applied for is not confined to the particular combinations of features or elements set out in the following claims. Protection is herein applied for, for any one or more of the features or elements referred to in the following claims, or described in the foregoing specifications or shown in the accompanying drawings, either independently or in combination.

It is claimed:

1. In a suction cleaner, a body, a handle pivoted on said body, locking segment means rigidly mounted on said body, locking detent means movable with said handle and pivoted thereto for engagement with said segment means below the pivotal axis of said handle, means for actuating said detent means for removable engagement with said segment means, and spring means connected to said body and to said handle below the pivotal axis of the latter for counterbalancing the weight of said handle.

2. In a suction cleaner having a motor for operating a fan to create suction, a body, a handle pivoted on said body, electrical connector means disposed in said handle, electrical conductors connecting said electrical connector means to the motor, locking segment means, locking detent means pivoted on said handle and engageable with said segment means below the pivotal axis of said handle to lock said handle in a plurality of positions, and means extending from said detent means upwardly through the insulation of said electrical connector to the upper end of said handle for actuation by the hand of the operator to actuate said detent means for removable engagement with said segment means.

3. In a suction cleaner having a motor, a body, a handle pivoted on said body, electrical connector means disposed in said handle for effecting connection of said motor to a source of current and having an opening extending through its insulation, locking segment means, locking detent means engageable with said segment means to lock said handle in a plurality of positions, and means for actuating said detent means comprising two rods one of said rods extending from said detent means into said opening in said insulation and the other rod extending from said opening in said insulation upwardly in said handle to the upper end thereof, the insulation defining said opening forming a part of the operative engagement between said two rods.

4. In a suction cleaner, a body, a handle pivoted on said body, locking segment means mounted on said body, locking detent means pivoted on said handle for engagement with said segment means to lock the handle in a plurality of positions, and means for actuating said detent means comprising lower and upper rods, said lower rod extending from said detent means upwardly into said handle, said upper rod extending upwardly in said handle from said lower rod to the upper end of said handle, means normally urging said upper rod into engagement with said lower rod, and hand operated means for actuating said upper rod in engagement with said lower rod to actuate said detent means.

5. In a suction cleaner having a motor, a body, a handle socket pivoted on said body, a handle removably disposed in said socket, cooperating electrical connectors in said socket and handle for effecting connection to said motor from a source of current, means for controlling the position of said handle with respect to said body, disjointed means disposed in said handle and extending from said handle control means upwardly through said electrical connectors to the upper end of said handle and adapted to be actuated by the hand of the operator to manipulate said control means, and means in said electrical connectors for receiving the adjacent ends of said disjointed actuating means, whereby upon separation of said handle and socket the adjacent ends of said disjointed means are supported in said electrical connectors.

6. In a suction cleaner having a motor, a body, a handle socket pivoted on said body, a handle removably disposed in said socket, cooperating male and female electrical connectors in said socket and handle for effecting connection of said motor to a source of current, means for positioning said handle in adjusted positions with respect to said body, disjointed means disposed in said handle and extending from said handle positioning means upwardly through said electrical connectors to the upper end of said handle, means actuated by the operator to manipulate said disjointed means to operate said handle positioning means, means in said electrical connectors for supporting the adjacent ends of said disjointed means, said electrical connectors having their male and female contacts arranged with respect to the adjacent ends of said disjointed means whereby upon connecting said male and female contacts the adjacent ends of said disjointed means are brought into register.

7. In a suction cleaner, a body, a handle pivotally mounted on said body, segment means mounted on said body, latch means pivotally carried by said handle and engageable with said segment means for holding the handle in adjusted positions, rod means disjointed from said latch means and extending upwardly in said handle, hand actuated means connected to said rod means to operate the latter to move said latch means out of engagement with said segment means, and a spring for moving said latch means into locking engagement with said segment means, said spring moving said rod means and hand actuated means into handle locking position upon said movement of said latch means into locking engagement with said segment means.

8. In a suction cleaner, a body, a handle pivoted on said body, locking sector means rigidly mounted on said body and including a detent-seating face having outwardly and downwardly facing portions, locking detent means movable with said handle and pivoted thereon for movement toward and from the detent-seating face of said sector means, means for actuating said detent means for removable engagement with said sector means, and spring means connected to said body below the pivotal axis of said handle and to said handle for counterbalancing the weight of said handle.

9. In a suction cleaner, a body, a handle pivoted on said body, locking sector means rigidly mounted on said body and including a detent-seating face having outwardly and downwardly facing portions, locking detent means movable with said handle and pivoted thereon for movement toward and from the detent-seating face of said sector means, spring means urging said detent means toward said sector means with a positive force to overcome gravity acting thereon in certain handle positions, manually operable means extended downwardly through said handle and into operating contact with said detent means and adapted to move said detent means from said sector means and spring means connected to said body below the pivotal axis of said handle and to said handle for counterbalancing the weight of said handle.

THE HOOVER COMPANY,
*Assignee.*
By HOWARD EARL HOOVER,
*Vice President.*